No. 866,035. PATENTED SEPT. 17, 1907.
S. H. JONES.
JOURNAL BEARING.
APPLICATION FILED MAR. 7, 1907.
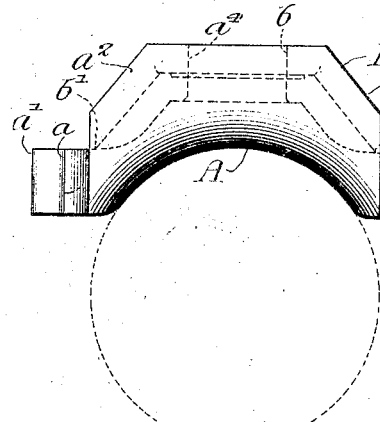
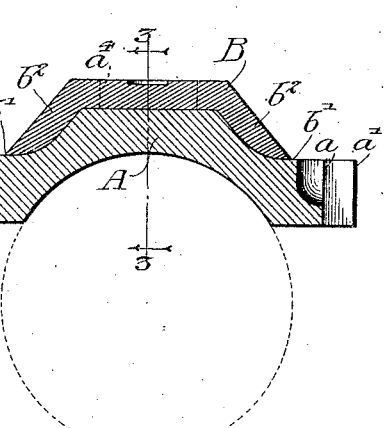
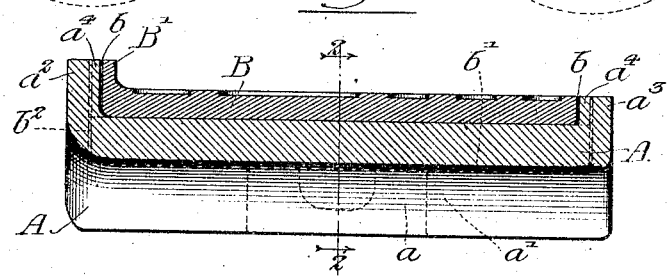
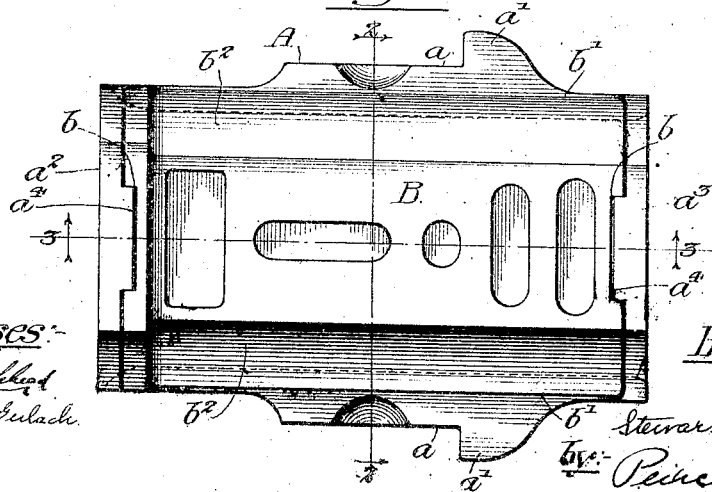
Witnesses:
Inventor:
Stewart H. Jones

UNITED STATES PATENT OFFICE.

STEWART H. JONES, OF BUFFALO, NEW YORK.

JOURNAL-BEARING.

No. 866,035.　　　Specification of Letters Patent.　　　Patented Sept. 17, 1907.

Application filed March 7, 1907. Serial No. 361,066.

*To all whom it may concern:*

Be it known that I, STEWART H. JONES, a citizen of the United States, residing at Buffalo, in the county of Erie, State of New York, have invented certain new and useful Improvements in Journal - Bearings, of which I do declare the following to be a full, clear, and exact description, reference being had to the accompanying drawings, forming part of this specification.

The present invention has relation to that class of journal bearings commonly known as composite bearings, in which the wearing portion of the bearing is formed of bronze, brass or similar material, reinforced by a back of iron, steel or like cheap, strong and durable metal.

In composite journal bearings of the character described, as heretofore constructed, it has been customary to extend the iron or steel back downward to the lower side edges of the bearing and to form upon such iron back the flanges and lugs that serve to position the bearing within the journal box. This construction of bearing has been found objectionable for the reason that after considerable wear the iron back is apt to come in contact with the journal, thereby causing overheating and injury of the parts.

One of the main objects of the present invention is to provide a composite journal bearing in which the side flanges and lugs are formed integral with the body portion or bearing of "brass", while the reinforcing shell of iron or steel partially encircles the "brass", but terminates at a point inside the flanges and lugs.

The invention consists in the features of novelty hereinafter described, illustrated in the accompanying drawing and particularly pointed out in the claims at the end of this specification.

Figure 1 is an end view of a composite journal bearing embodying my invention. Fig. 2 is a view in vertical cross section on line 2—2 of Figs. 3 and 4. Fig. 3 is a view in longitudinal section on line 3—3 of Fig. 2. Fig. 4 is a plan view of my improved bearing.

A designates the body portion of the bearing that is formed of brass, bronze or similar metal and B denotes the upper shell or back portion that will be formed of cast iron, steel or like cheap, strong and durable metal. Integral with the body portion A are formed the usual side flanges $a$ and lugs $a'$ common to journal bearings of the Master Car Builders' type. At the ends of the body portion of the bearing are also formed the upwardly extending flanges $a^2$ and $a^3$ between which rests the iron shell B. The upper face of the body portion A of the bearing is formed of polygonal outline and the inner face of the shell B is correspondingly formed to engage and interlock with the upper face of the body portion A. Preferably, the ends of the shell B are formed with seats or notches $b$ to receive the inwardly extending lugs $a^4$ that are formed upon the vertical flanges $a^2$ and $a^3$ at the ends of the body portion A, one of these notches $b$ being formed in the vertical flange B' at one end of the iron shell B. By reference to Figs. 1, 2 and 4 of the drawings, it will be seen that the lower edges $b'$ of the downwardly extending side walls $b^2$ of the shell B terminate above and inside the flanges $a$ and lugs $a'$ of the body portion A. The iron back or shell B and the body portion or "brass" may be cast separately and then set together for use, the shell being securely interlocked with the body portion or "brass" by the end flanges $a^2$ and $a^3$, end lugs $a^4$ and by the engagement of the side walls $b^2$ of the shell with the correspondingly inclined upper side parts of the body portion A.

My invention affords a most durable and safe construction of bearing, possessing the good qualities of an all-brass bearing and having also the increased strength, cheapness and durability of the iron-back bearing. Inasmuch as the side walls of the iron-back terminate above and inside the flanges and lugs $a$ and $a'$ that are formed integral with the body portion A, all danger of the iron shell or back coming in contact with the journal, after long service, is avoided, and the vertical flanges $a^2$ and $a^3$ at the ends of the body portion A also serve to effectively prevent contact of the ends of the iron back with the journal. The iron back or shell B can be reapplied to new body portions A whenever the latter have become so worn as to unfit them for further use.

Having thus described my invention, what I claim as new, and desire to secure by Letters Patent, is:—

1. A journal bearing comprising a body portion of brass or like material having vertical end flanges and side flanges formed integral therewith and an iron shell extending across and partially down the sides of said body portion, said shell being of proper thickness, size and shape to extend between the end flanges and to terminate at the side flanges thereof, said side flanges projecting laterally beyond said shell.

2. A journal bearing comprising a body portion of brass 
or like material having formed integral therewith vertical end flanges and lateral side flanges and lugs and an iron shell extending across the top of said body portion and interlocked at its ends with the vertical end flanges of said body portion, said iron shell terminating inside the line of the side flanges and lugs of said body portion.

3. A journal bearing comprising a body portion of brass or like material having formed integral therewith vertical end flanges provided with inwardly extending lugs and having side flanges and lugs and an iron shell extending across the top and partially down the sides of said body portion, said iron shell having seats to receive the vertical lugs at the ends of the body portion and terminating inside the line of the side flanges and lugs of said body portion, said iron shell and said body portion being formed separately and detachably interlocked.

STEWART H. JONES.

Witnesses:
BERTRAM M. TATE,
EDWIN M. ROBBINS.